(12) United States Patent
Chang et al.

(10) Patent No.: US 10,890,010 B1
(45) Date of Patent: Jan. 12, 2021

(54) THREE-FOLD VEHICLE TOP TENT

(71) Applicant: Tianjin Playdo Outdoor Products Co., Ltd., Beijing (CN)

(72) Inventors: Yingquan Chang, Beijing (CN); Junchi Liu, Beijing (CN); Benhan Zhou, Beijing (CN); Kaijie Guan, Beijing (CN)

(*) Notice: Subject to any disclaimer, the term of this patent is extended or adjusted under 35 U.S.C. 154(b) by 0 days.

(21) Appl. No.: 16/726,830

(22) Filed: Dec. 25, 2019

(51) Int. Cl.
*E04H 15/06* (2006.01)
*B60P 3/34* (2006.01)
*E04H 15/32* (2006.01)
*E04H 15/20* (2006.01)

(52) U.S. Cl.
CPC .............. *E04H 15/06* (2013.01); *B60P 3/341* (2013.01); *E04H 15/20* (2013.01); *E04H 15/324* (2013.01); *E04H 2015/201* (2013.01)

(58) Field of Classification Search
CPC ....................................................... E04H 15/06
See application file for complete search history.

(56) References Cited

U.S. PATENT DOCUMENTS

| | | | | |
|---|---|---|---|---|
| 1,477,111 A * | 12/1923 | Eaton | ...................... | B60P 3/341 296/174 |
| 2,561,168 A * | 7/1951 | Beckley | ................... | B60P 3/38 52/66 |
| 3,009,471 A * | 11/1961 | Rossiter | ................... | B60P 3/38 135/88.16 |
| 3,454,020 A * | 7/1969 | Grossman | ................. | B60P 3/38 135/116 |
| 3,623,762 A * | 11/1971 | Fagan | ....................... | B60P 3/38 135/88.15 |
| 4,077,662 A * | 3/1978 | Kauffman | ................. | B60P 3/38 296/165 |
| 4,300,797 A * | 11/1981 | Whitley | .................... | B60P 3/42 296/164 |
| 7,201,431 B1 * | 4/2007 | Calandruccio | .......... | B60P 3/341 296/165 |
| 7,357,440 B1 * | 4/2008 | Calandruccio | .......... | B60P 3/341 296/156 |
| 2019/0352924 A1 * | 11/2019 | Currid | ..................... | E04H 15/54 |

* cited by examiner

*Primary Examiner* — Noah Chandler Hawk
(74) *Attorney, Agent, or Firm* — Zan IP

(57) ABSTRACT

A three-fold vehicle top tent, includes a fixing bed board, a back surface of the fixing bed board is provided with a profile frame connected to a top of vehicle. A first folding bed board hinged on a side of the fixing bed board, the first folding bed board can be rotated to be flush with or be folded on the fixing bed board. A second folding bed board hinged on another side of the fixing bed board, the second folding bed board can be rotated to be flush with or be folded on the fixing bed board. When the second folding bed board is folded, the second folding bed board is layered on the first folding bed board and is fixed via a fastening component. And a tent component, the three-fold vehicle top tent is formed after the tent component is set up.

14 Claims, 6 Drawing Sheets

THREE-FOLD VEHICLE TOP TENT

TECHNICAL FIELD

The present disclosure relates to the technical field of vehicle top tent, and in particular to a three-fold vehicle top tent.

BACKGROUND

With the popularity of self-driving tours, outer door camping has gradually become increasingly popular. The vehicle top tent is a temporary resting place that can be quickly installed on the roof of the vehicle, which is more comfortable and convenient than the conventional ground tent. Vehicle top tents can be divided into soft-top tents and hard-top tents according to their materials and structures.

At present, the size of a conventional vehicle top tent is generally large, and can only be installed on larger vehicles such as SUV or off-road. When installed on home cars, they will protrude from the plane of the roof and causing a certain danger. Also, since its large volume and heavy weight, it is hard to be mounted and received.

The vehicle top soft-top tents are mostly folding tents. After folding, the size is reduced and the volume of the tent becomes larger when the tent is unfolded. However, the conventional soft-top tent is configured of closed structure with a hood, and the wind noise and wind resistance will be relatively obvious. Moreover, it is very difficult to install other outdoor equipment or other large items on it. When a folding tent is unfolded, the unfolded bed boards require a ladder to support them, which may cause safety risks.

Generally, the ventilation of a conventional vehicle top tents is relatively poor. At night, the user might close the door in order to protect the privacy or shelter the rain, such that the ventilation in the closed tent becomes relatively poor, which seriously affects the using experience of the vehicle top tent.

SUMMARY

Accordingly, it is necessary to provide a three-fold vehicle top tent, which can be constructed quickly with higher safety. Outer equipment such as bike or snowboard can be place on the top of the tent, that is, the upper part of the bed boards has the function of a mounting rack or a roof box, and the storage functions are added compared with the conventional soft-top tent.

A three-fold vehicle top tent, includes a fixing bed board, and a back surface of the fixing bed board is provided with a profile frame connected to a top of a vehicle; a first folding bed board hinged with a limited rotation on a side of the fixing bed board, and the first folding bed board can be rotated to be flush with the fixing bed board, or be folded on the fixing bed board; a second folding bed board hinged with a limited rotation on another side of the fixing bed board, and the second folding bed board is capable of being rotated to be flush with the fixing bed board, or be folded on the fixing bed board, when the second folding bed board is folded, the second folding bed board is layered on the first folding bed board and is fixed via a fastening component, a back of the second folding bed board is provided with a mounting rack; and a tent component, the three-fold vehicle top tent is formed after the tent component is set up.

The three-fold vehicle top tent according to the present disclosure has two forms on the structure of the bed board, that is, an unfolded and a folded form. When it is unfolded, the structure is stable and the bearing capacity is large. When it is folded, it is fastened by a fastening component, such that it occupies a small space, is fastened and mounted on the vehicle top, and has a mounting rack, which is convenient for placing external objects and can reduce wind resistance. The number and mounting method of the mounting rack are easy to determine and operate.

In the present disclosure, the front surface is the upper surface of unfolded bed boards, and the back surface is the nether surface of the bed boards.

The three-fold vehicle top tent according to the present disclosure can be constructed quickly with higher safety. The occupation of space is small with folded, and outer modules can be added on its top. Outer equipment such as bike or snowboard can be place on the top of the tent, that is, the upper part of the bed boards has the function of a mounting rack or a roof box, and the storage functions are added compared with the conventional soft-top tent.

The product functionality is increased, which provides convenience for storage and transportation of large objects, structural and functional design can better reduce wind resistance and wind noise, small overall size after storage, more suitable for the roof of smaller vehicle, therefore it has a better compatibility. The folding size is not limited by the roof of various models. After the three-folding is unfolded, the volume in the tent can be increased. The user has more rest space. The opening method is simple to operate. The tent can be constructed faster, enhances the user experience of consumers, and improves the safety performance of vehicle top tents.

After the construction, a quieter living space is created for the user, and the sound of rainwater directly on the tarpaulin will be greatly reduced.

In the aspect of storage, the folded size is close to a size of a large suitcase, and detachable wheels are adjusted, such that the tent can be transported and moved into and out from the elevator conveniently.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Figure 1:
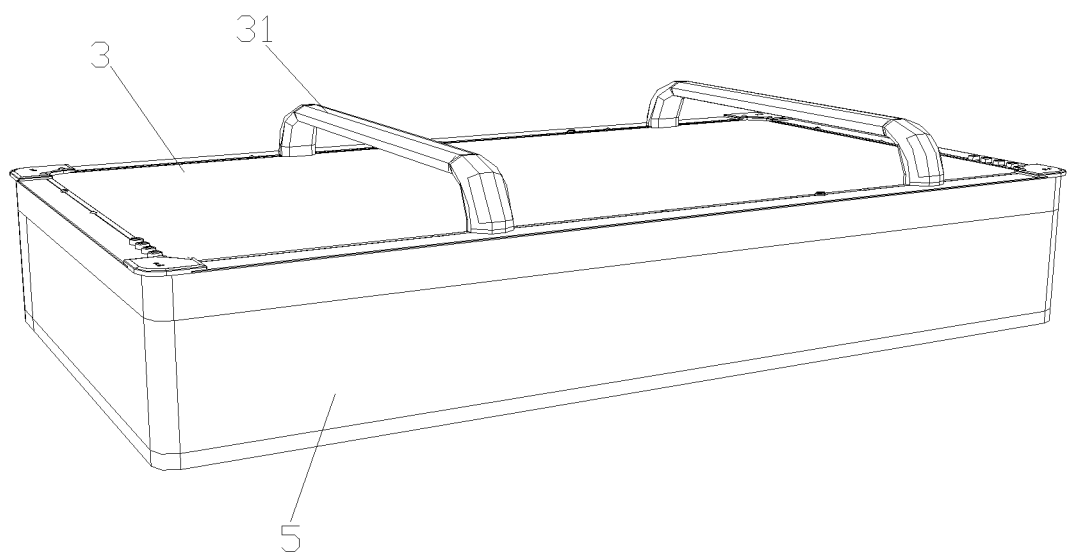
FIG. 1 is a perspective view of a three-fold vehicle top tent according to an embodiment in a folded status.

The present disclosure will be further described in detail below with reference to the drawings.

Embodiment 1

Referring to FIG. 1 to 5, the bed boards includes a fixing bed board 1, the bottom of the fixing bed board 1 has a profile rack 10 connected to a top of a vehicle, and a plurality of mounting hole-post structures are provided on the profile rack 10.

A first folding bed board 2 is hinged with a limited rotation on a side of the fixing bed board 1, and the first folding bed board 2 can be rotated to be flush with the fixing bed board 1, or be folded on the fixing bed board 1.

A second folding bed board 3 is hinged with a limited rotation on another side of the fixing bed board 1, and the second folding bed board 3 can be rotated to be flush with the fixing bed board 1, or be folded on the fixing bed board 1. When the second folding bed board 3 is folded, the second folding bed board 3 is layered on the first folding bed board 2 and is fixed by a fastening component 4, a back of the second folding bed board 3 is provided with a mounting rack 31. In the illustrated embodiment, two mounting racks 31 are provided, and forms a deck structure with the bed boards, which can provide convenience for storage and transportation of large objects, and the structural function design can better reduce wind resistance and wind noise.

A tent component, and the three-fold vehicle top tent is formed after the tent component is set up.

In actual use, a pad can be placed above the bed boards, the pad can be functioned as a mattress, and the pad may be an inflatable pad.

Since the volumes of the bed boards are smaller, they can be more suitable for more types of vehicles, and it is easier to be mounted and stored. It is convenient to be transported and stored easily even by one person after disassembly.

The occupation of space is small with folded, and outer modules can be added on its top if required. The product functionality is increased, which provides convenience for storage and transportation of large objects, structural and functional design can better reduce wind resistance and wind noise.

With the three-fold structure of the bed boards, the folded bed boards can withstand the pressure of two adults even without any support, and the safety factor is higher.

In the unfolded status of the illustrated embodiment, a first hinging part 11 is located between the first folding bed board 2 and the fixing bed board 1, a rotating axis of the first hinging part 11 is located above a front surface of the fixing bed board 1. When unfolded, the first folding bed board 2 is flush with the fixing bed board 1 and adjacent to the fixing bed board 1. Since the rotating axis of the first hinging part 11 is located above a front surface of the fixing bed board 1, when first folding bed board 2 is flush with the fixing bed board 1 and adjacent to the fixing bed board 1, the first folding bed board 2 is restricted from further rotation, such that the first folding bed board 2 can only be rotated in a 180 degree angle starting from the horizontal direction.

In the unfolded status of the illustrated embodiment, a second hinging part 12 is provided between the second folding bed board 3 and the fixing bed board 1, a rotating axis of the second hinging part 12 is located above the front surface of the fixing bed board 1. When unfolded, the second folding bed board 3 is flush with the fixing bed board 1 and adjacent to the fixing bed board 1, and the rotating axis of the second hinging part 12 is located higher than the rotating axis of the first hinging part 11. The mounting and rotating method of the second folding bed board 3 is the same as that of the first folding bed board 2, except that the rotating axis of the second hinging part 12 is located higher than the rotating axis of the first hinging part 11, such that when the second hinging part 12 is folded, it is located higher above the first folding bed board 2.

In the folded status of the illustrated embodiment, front surfaces of the first folding bed board 2 and the second folding bed board 3 are provided with a supporting post 21, respectively. When folded, the supporting posts 21 abut on the adjacent bed boards. The supporting posts 21 keep the folded structure stable, protect the structure from deforming under pressure, and protects the hinge from damage.

Embodiment 2

Figure 2:
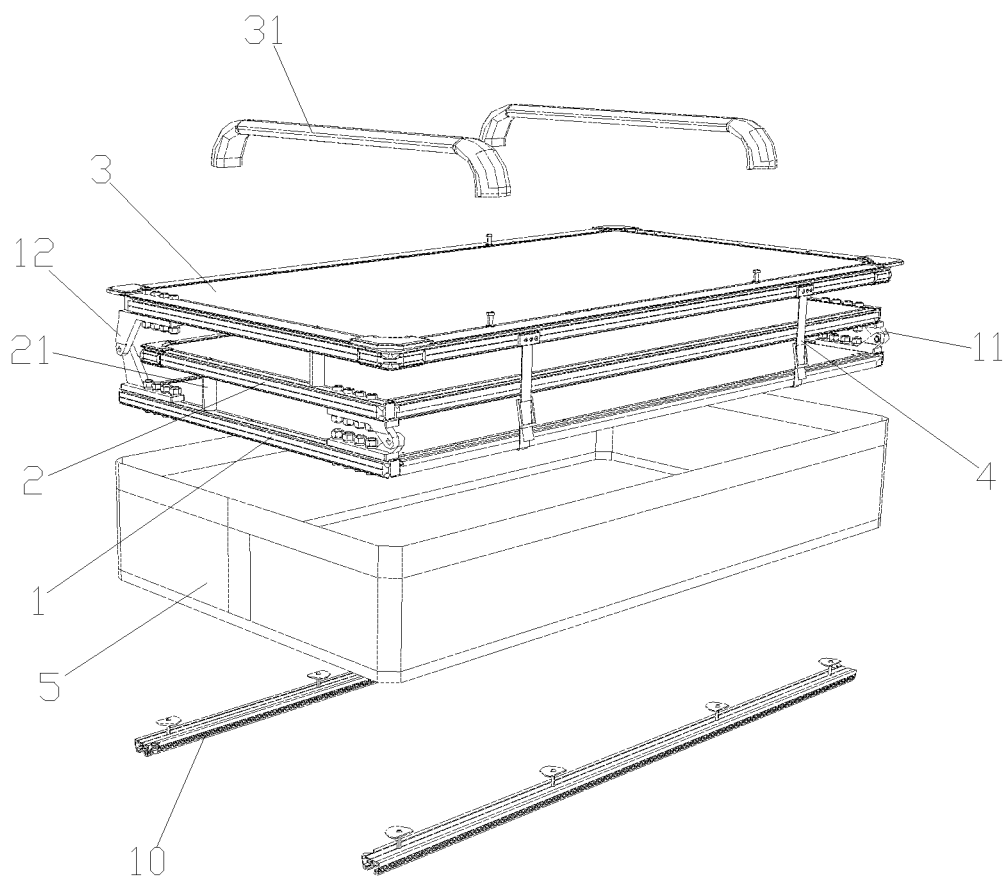
FIG. 2 is an exploded view of a three-fold vehicle top tent according to an embodiment.
Figure 3:
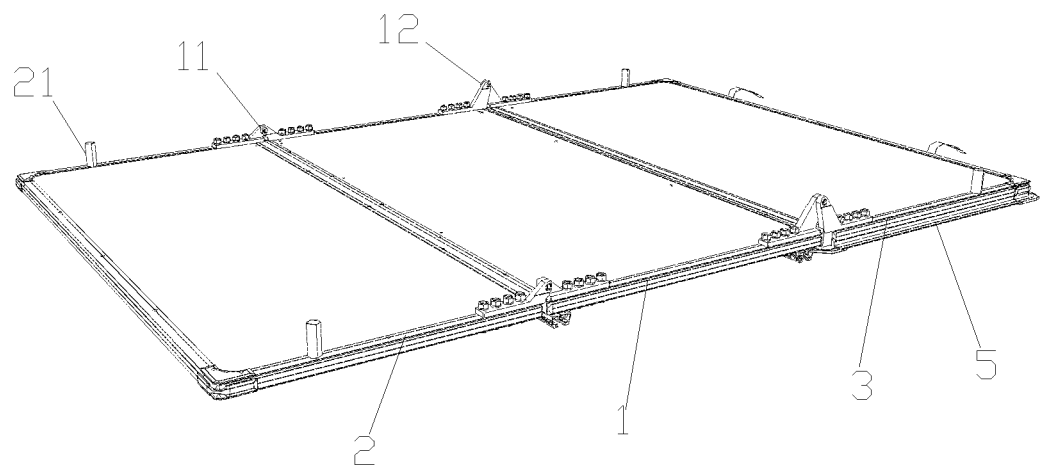
FIG. 3 is a perspective view of unfolded bed boards of a three-fold vehicle top tent according to an embodiment.
Figure 4:
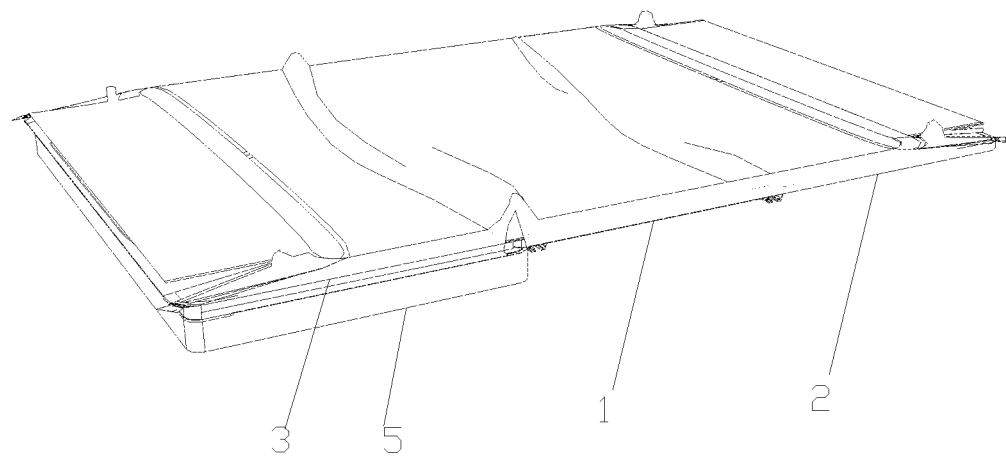
FIG. 4 is a perspective view of unfolded bed boards and a flattened tent component of a three-fold vehicle top tent according to an embodiment.
Figure 5:
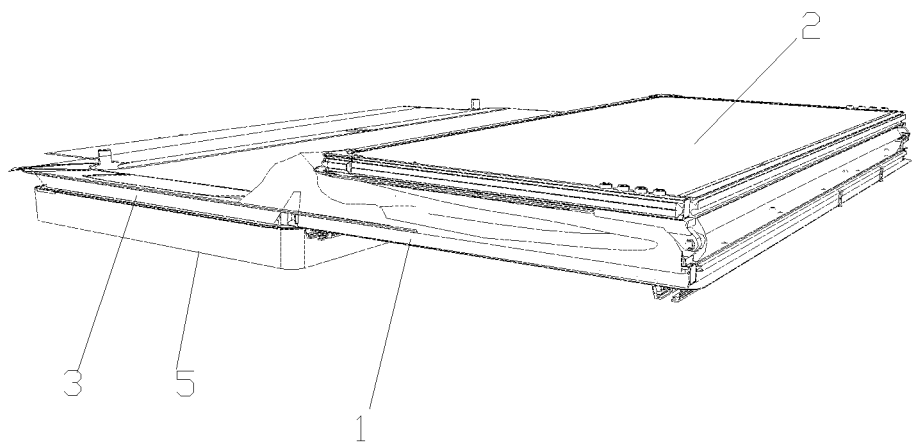
FIG. 5 is a perspective view of bed boards of a three-fold vehicle top tent during a folding process according to an embodiment.

Referring to FIGS. 1 and 2, the three-fold vehicle top tent according to the illustrated embodiment is in a not mounted yet or is detached from the vehicle top. The three-fold vehicle top tent further includes a waterproof hood 5, when the bed boards are folded, the waterproof hood 5 wraps around a periphery of the bed boards.

The fastening component 4 is a fastening woven tape. The folded bed boards are fastened by the fastening woven tape. In the illustrated embodiment, two fastening woven tapes are provided.

Figure 6:
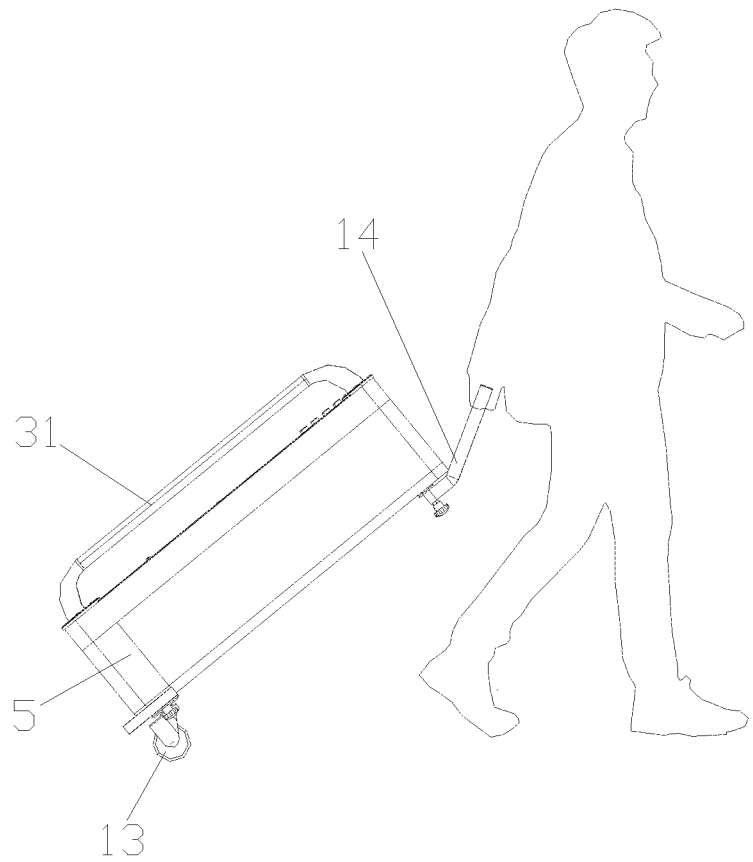
FIG. 6 is a schematic view of a three-fold vehicle top tent according to an embodiment being detached and towed.

In the folded status of the illustrated embodiment, as shown in FIG. 6, the three-fold vehicle top tent further includes a detachable corner wheel 13 and a detachable handle 14, when folded, the corner wheel 13 and the handle 14 are mounted on the both side of the bottom of the fixing bed board 1, respectively. In order to facilitate the operation, a hand-tightened screw is used for fastening, which is convenient for transportation and towing. That is, it can be functioned as a cart, which facilitates the transportation of the vehicle top tent as a whole after disassembly.

Embodiment 3

Figure 7:
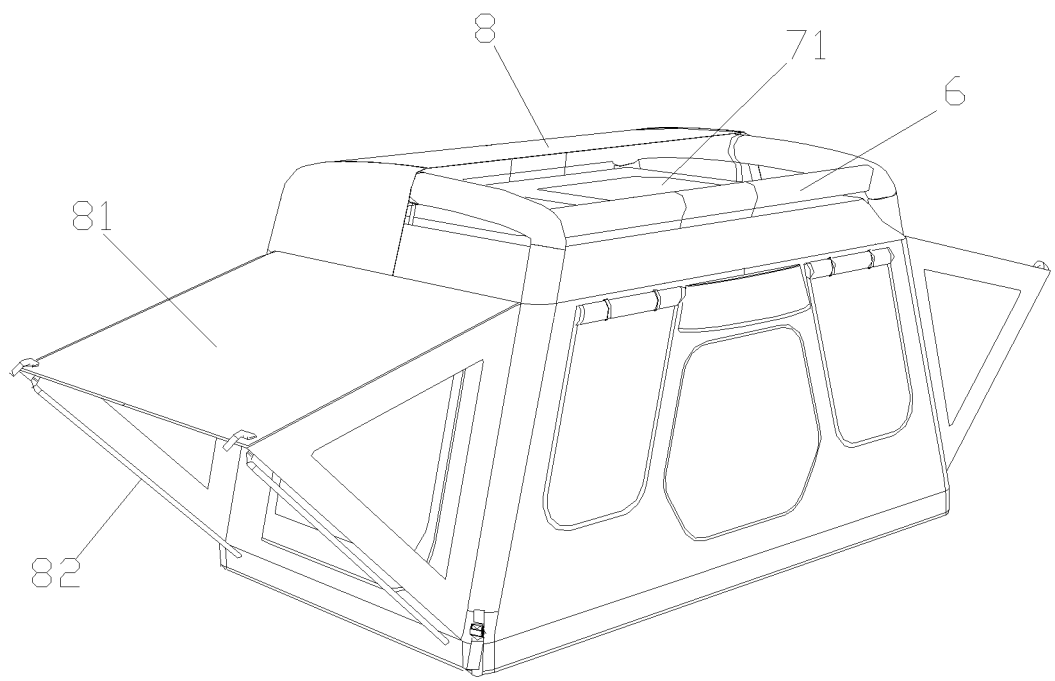
FIG. 7 is a perspective view of unfolded bed boards and a supported tent component of a three-fold vehicle top tent according to an embodiment.
Figure 8:
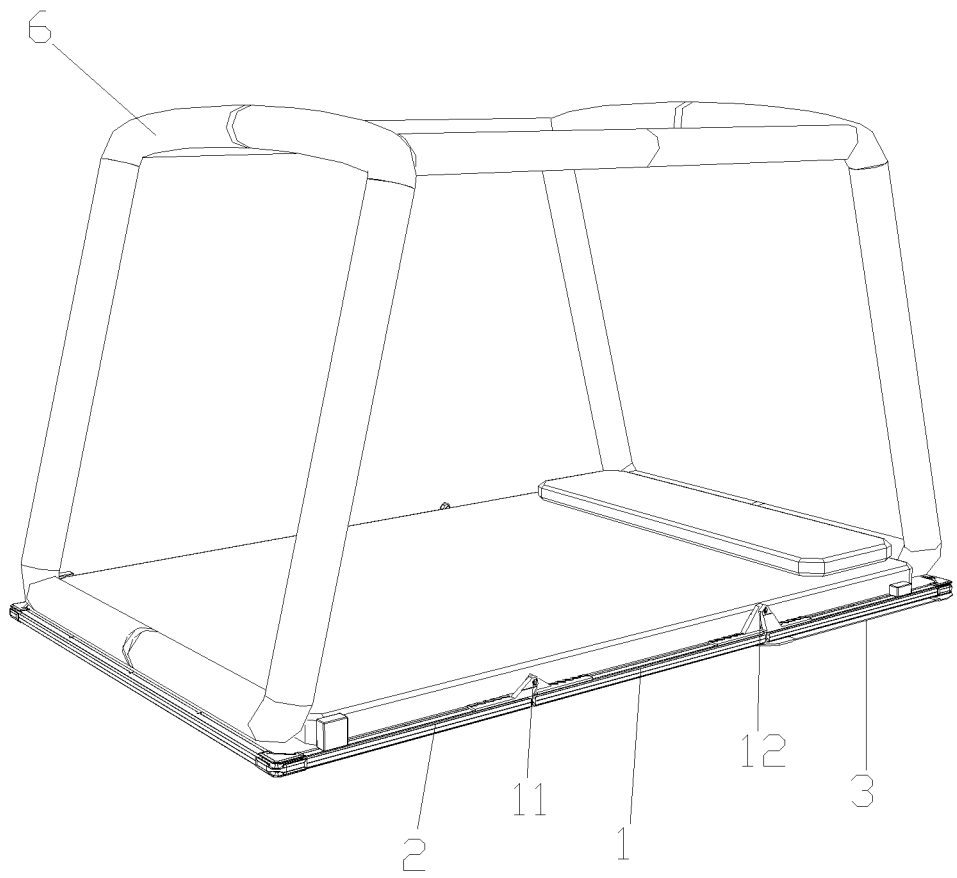
FIG. 8 is a perspective view of a frame formed by an inflated inflatable tube of a three-fold vehicle top tent according to an embodiment.

As shown in FIG. 7 and FIG. 8, the tent component includes a inflatable tube 6 and a tarpaulin 7, a frame is formed when the inflatable tube 7 is inflated, and the tarpaulin is connected to each surfaces of the frame. The connection between the tarpaulin 7 and the upper part of inflatable tube 6 is further reinforced by a connecting belt.

The tent component further includes an outer hood 8, and the inflatable tube 6 forms a gap between the outer hood 8 and the tarpaulin 7. The sound of rain directly on the tarpaulin 7 will be greatly reduced, creating a quieter living space for users.

In the illustrated embodiment, the tarpaulin 7 has a skylight 71 on its upper part.

According to the structure of the inflatable tube of the tent, the skylight 71 can increase the ventilation, which is not affected even in rainy weather. At the same time, the problem of water condensation can be reduced to a certain extent In rainy days, since the inflatable tube forms a gap between the tarpaulin 7 and the outer hood 8, compared with the sound of rain directly on the tarpaulin, the sound will be greatly reduced, creating a quieter living space for users.

Wherein, both sides of the tent component have a transparent window structure and a rain cover 81. When the three-fold vehicle top tent is mounted on the vehicle top and is unfolded, the rain cover 81 can be supported by a bracket 82.

When the bed boards are unfolded, an air pump to connected to the power supply in the car can be used to pump the inflatable tube 6 through an air nozzle of the inflatable tent, then the construction of the tent is finished when the inflation is done.

When the tent is used and required to be stored, the air pump is used to extract the air in the inflatable tube 6. When the deflation is done, the air in the tent is exhausted, the bed boards are folded, and the tent can be stored.

The overall storage is completed after the bed boards are folded, the woven tape is fastened, and the outer hood 8 is zippered.

After the bed boards are stored, they form a box. Extra modules can be added on the box, such that outer equipment such as bike or snowboard can be place on the top of the box. That is, the upper part of the bed boards has the function of a mounting rack or a roof box, and the storage functions are added compared with the conventional soft-top tent.

Compared with a conventional tent with supporting poles, the inflatable structure of the tent makes the tent more reliable and and has stronger wind resistance.

With a small overall size after storage, the tent is more suitable for the roof of smaller vehicle.

In the aspect of storage, the folded size is close to a size of a large suitcase, and detachable wheels are adjusted, such that the tent can be transported and moved into and out from the elevator conveniently.

Overall, the storage function is added on the bed boards, and the structure can better reduce wind resistance and wind noise. Compared with a conventional hard-top tent, the outer hood 8 is zippered to the stored bed boards, such that the wind resistance and wind noise during driving is reduced, and the product not only keeps a lighter weight, but also increase the functionality of storing other objects.

Moreover, the folding size is not limited by the roof of various models. After the three-fold vehicle top tent is unfolded, the volume in the tent can be increased, such that user has more rest space. Also, the opening method is simple to operate. The tent can be constructed faster, not only enhances the user experience of consumers, and also improves the safety performance of vehicle top tents.

Since the bed boards can be three-folded, and the tent is supported by the inflatable tube, the tent of the tent according to the present disclosure can be constructed more quickly.

Embodiment 4

Figure 9:
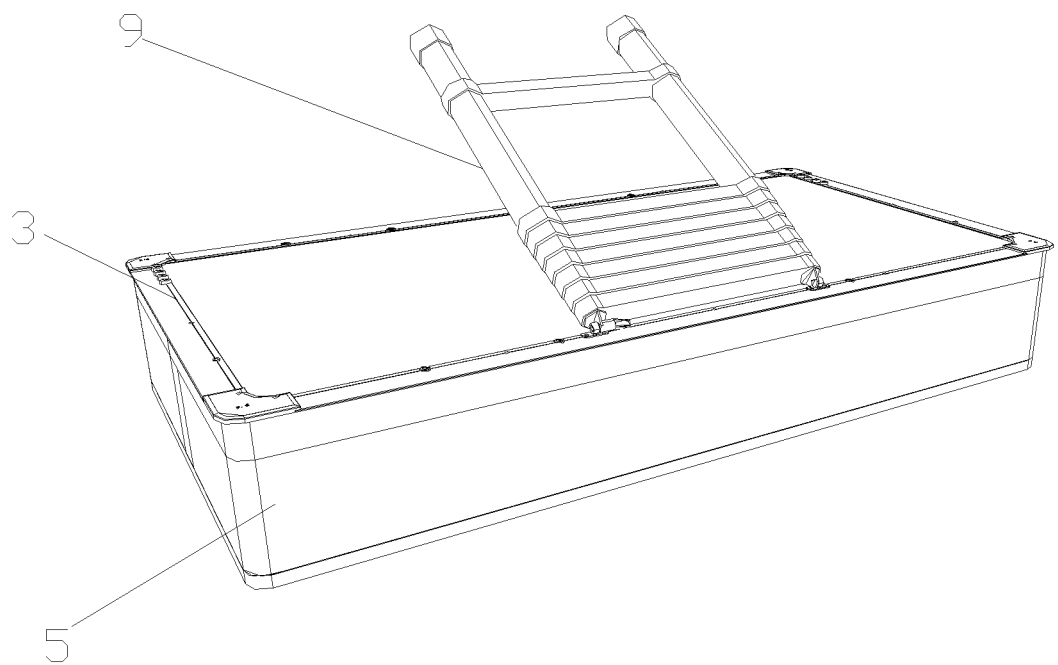
FIG. 9 is a perspective view of the bed boards and a mounted ladder of a three-fold vehicle top tent according to an embodiment.
Figure 10:
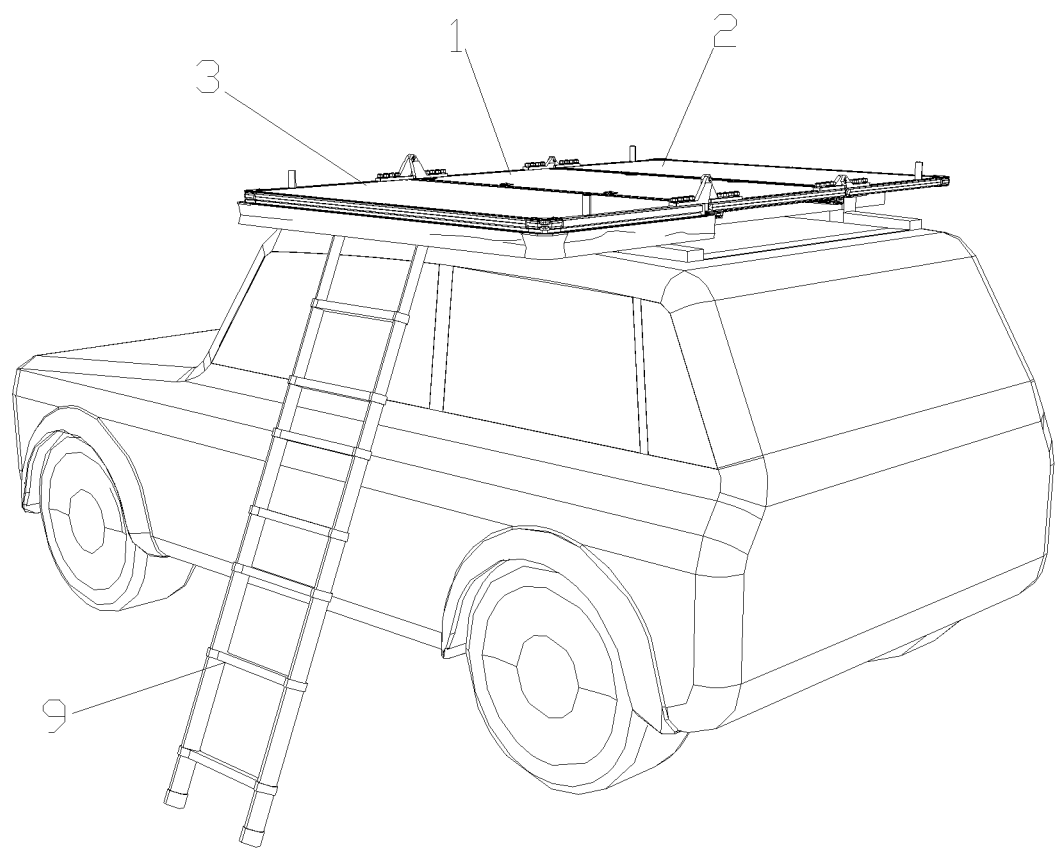
FIG. 10 is a perspective view of bed boards of a three-fold vehicle top tent according to an embodiment mounted on the top of a vehicle.

Referring to FIGS. 9 and 10, the tent according to the illustrated is mounted on the top of the vehicle and is unfolded. When the bed boards are unfolded, a ladder 9 is mounted on the back surface of the second folding bed board 3. An end of the ladder 9 is connected to a ground and another end of the ladder 9 is mounted on the back surface of the second folding bed board 3. The ladder 9 may be mounted on the back surface of the second folding bed board 3 by a screw.

Figure 11:
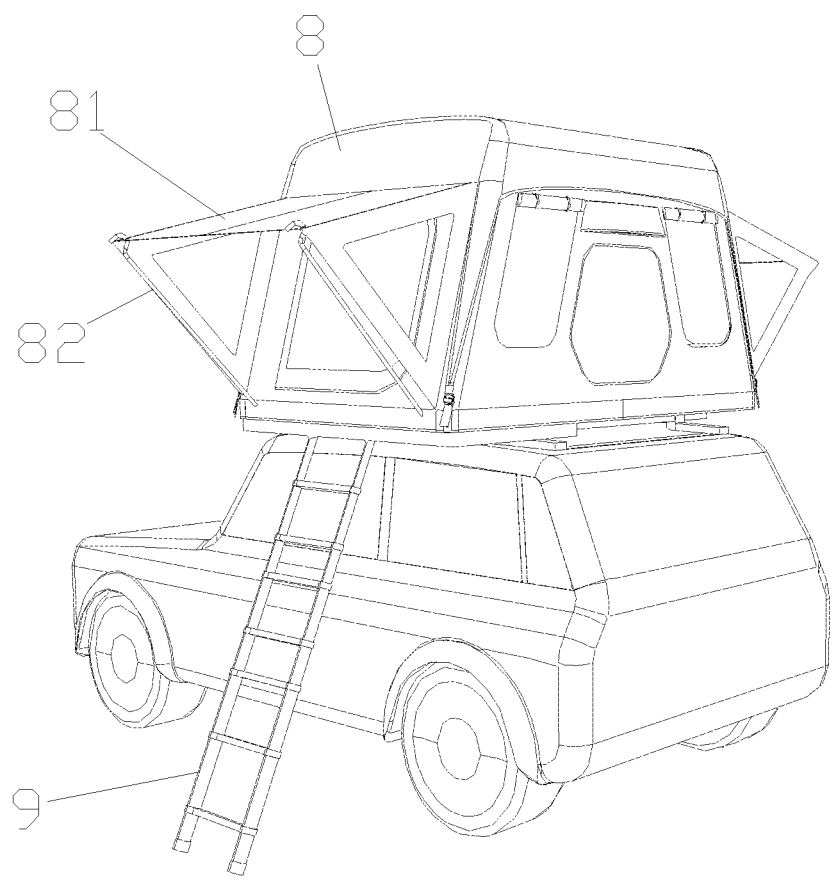
FIG. 11 is a perspective view of an entire structure of a three-fold vehicle top tent according to an embodiment mounted on the top of a vehicle.

On the one hand, the user uses a ladder 9 to quickly install it in the quick mounting seat on the top of the bed boards, so as to complete the connection with the bed boards and unfold the bed boards, then, the bed boards can be unfolded by rope or other forms of traction, or manual traction. After the bed boards are unfolded, an end of the ladder 9 is connected to the ground. FIG. 11 shows an overall structure of the tent when unfolded.

The specific embodiments are only explanations of the present disclosure, and the embodiments are not intended to limit the present disclosure. Rather, various modifications may be made in the details within the scope and range of equivalents of the claims and without departing from the present disclosure. The scope of this present disclosure is not limited to the content of the description, and its technical scope shall be determined according to the scope of the claims.

What is claimed is:

1. A three-fold vehicle top tent, comprising:
   a fixing bed board, wherein a back surface of the fixing bed board is provided with a profile frame connected to a top of a vehicle;
   a first folding bed board, hinged with a limited rotation on a side of the fixing bed board, wherein the first folding bed board is capable of being rotated to be flush with the fixing bed board, or be folded on the fixing bed board;
   a second folding bed board, hinged with a limited rotation on another side of the fixing bed board, wherein the second folding bed board is capable of being rotated to be flush with the fixing bed board, or be folded on the fixing bed board, when the second folding bed board is folded, the second folding bed board is layered on the first folding bed board and is fixed via a fastening component, a back of the second folding bed board is provided with a mounting rack; and
   a tent component, wherein the three-fold vehicle top tent is formed after the tent component is set up;
   wherein front surfaces of the first and the second folding bed board are provided with a supporting post, respectively, when the first and the second folding bed board are folded, the supporting posts abut on the adjacent bed board.

2. The three-fold vehicle top tent according to claim 1, wherein a first hinging part is provided between the first folding bed board and the fixing bed board, a rotating axis of the first hinging part is located above a front surface of the fixing bed board, when the first folding bed board is unfolded, the first folding bed board is flush with the fixing bed board and adjacent to the fixing bed board.

3. The three-fold vehicle top tent according to claim 2, wherein a second hinging part is provided between the second folding bed board and the fixing bed board, a rotating axis of the second hinging part is located above the front surface of the fixing bed board, when the second folding bed board is unfolded, the second folding bed board is flush with the fixing bed board and adjacent to the fixing bed board, and the rotating axis of the second hinging part is located higher than the rotating axis of the first hinging part.

4. The three-fold vehicle top tent according to claim 1, further comprising a waterproof hood, when the bed boards are folded, the waterproof hood wraps around a periphery of the bed boards.

5. The three-fold vehicle top tent according to claim 1, wherein the fastening component is a fastening woven tape.

6. The three-fold vehicle top tent according to claim 5, wherein two fastening woven tapes are provided.

7. The three-fold vehicle top tent according to claim 1, further comprising a detachable corner wheel and a detachable handle, when folded, the corner wheel and the handle are mounted on the both side of the bottom of the fixing bed board, respectively.

8. The three-fold vehicle top tent according to claim 1, wherein the tent component comprises a inflatable tube and a tarpaulin, a frame is formed when the inflatable tube is inflated, and the tarpaulin is connected to each surfaces of the frame.

9. The three-fold vehicle top tent according to claim 8, wherein the tent component further comprises an outer hood, and the inflatable tube forms a gap between the outer hood and the tarpaulin.

10. The three-fold vehicle top tent according to claim 9, wherein the outer hood is connected to the bed boards via a zipper when the bed boards are folded.

11. The three-fold vehicle top tent according to claim 8, wherein the tarpaulin further defines a skylight on an upper part thereof.

12. The three-fold vehicle top tent according to claim 8, wherein the tent component is further provided with a rain cover and a bracket, and the rain cover is supported by the bracket.

13. The three-fold vehicle top tent according to claim 1, further comprising a detachable ladder, wherein an end of the ladder is connected to a ground and another end of the ladder is mounted on a back surface of the second folding bed board when the bed boards are unfolded.

14. The three-fold vehicle top tent according to claim 13, wherein the ladder is connected to the back surface of the second fixing bed board via a screw.

* * * * *